US007103774B2

(12) United States Patent
Wildish et al.

(10) Patent No.: US 7,103,774 B2
(45) Date of Patent: Sep. 5, 2006

(54) METHOD OF ESTABLISHING SECURE COMMUNICATIONS IN A DIGITAL NETWORK USING PSEUDONYMIC DIGITAL IDENTIFIERS

(75) Inventors: Michael Andrew Wildish, Scarborough (CA); Stephen M. Ansell, Newmarket (CA); Michael C. Crerar, Toronto (CA)

(73) Assignee: Diversinet Corp., Toronto (CA)

( * ) Notice: Subject to any disclaimer, the term of this patent is extended or adjusted under 35 U.S.C. 154(b) by 751 days.

(21) Appl. No.: 10/321,446

(22) Filed: Dec. 18, 2002

(65) Prior Publication Data

US 2003/0115457 A1 Jun. 19, 2003

(30) Foreign Application Priority Data

Dec. 19, 2001 (CA) .................................. 2365441

(51) Int. Cl.
*G06F 1/24* (2006.01)
(52) U.S. Cl. ...................... 713/176; 713/180; 713/182; 713/193
(58) Field of Classification Search ................ 713/176, 713/180, 182, 193
See application file for complete search history.

(56) References Cited

U.S. PATENT DOCUMENTS

| 4,910,660 | A | * | 3/1990 | Li | ............................... 700/47 |
| 5,949,045 | A | * | 9/1999 | Ezawa et al. | ............... 235/379 |
| 5,968,176 | A | * | 10/1999 | Nessett et al. | ................ 726/11 |

* cited by examiner

*Primary Examiner*—Thomas R. Peeso
(74) *Attorney, Agent, or Firm*—Lang Michener LLP

(57) ABSTRACT

A system and method of relating a public key to a compact identification string in a digital certificate to enable an entity to construct a certificate chain from a root certificate authority to an end-entity efficiently and further allow a certificate holder to store only its identifier, thus providing privacy protection, and present this in place of a digital certificate for authentication rather than storing and presenting its certificate or a chain of certificates representing the certificate path up to the root certificate authority. In a preferred embodiment, the certificate authority generates unique identifier for each certificate consisting its pseudonym concatenated with the pseudonyms of other sub-certificate authorities in the certificate chain between it and the certificate holder, concatenated with certificate holder's pseudonym. The pseudonyms are generated by the entity known by the pseudonym or the entity certifying a binding between the pseudonym and the entity's public key.

17 Claims, 3 Drawing Sheets

METHOD OF ESTABLISHING SECURE COMMUNICATIONS IN A DIGITAL NETWORK USING PSEUDONYMIC DIGITAL IDENTIFIERS

BACKGROUND OF THE INVENTION

This invention relates to the field of secure communications, and in particular to a method of establishing communication in a digital communications network comprising a hierarchical arrangement of digital certificate servers.

In asymmetric encryption technology, each user generates a pair of keys known as a public key and a private key. The public key is widely disseminated and used by others to encrypt communications intended for the owner of the pubic key. Once the message has been encrypted with the public key, it can only be decrypted with the corresponding private key. This is the basis of public key encryption.

The problem with this technology is that the sender needs to have a way of guaranteeing that the public key used for encryption does indeed belong to the recipient. Otherwise, the sender could unintentionally encrypt a message that could only be decrypted by some mischievous third party. A way was therefore needed for users to be able to have a high degree of assurance that the owner of a public key was indeed the intended recipient.

Digital certificates were invented to solve this problem. A recognized certificate authority issues a certificate binding the public key of a subscriber to his real world identity. The certificate is digitally signed by the recognized issuing authority. A message is digitally signed in effect by encrypting it with a private key. The message can then only be decrypted with the corresponding public key, and provided the user has a high degree of trust in the certifying authority, he will then have assurance that the public key contained in the certificate does indeed belong to the user to whom it is bound.

Digital certificates generally follow the X.509 standard, developed by the International Standards Organization (ISO) and the Comité Consultatif Internatinale Telegraphique et Telephonique (CCITT). These certificates create a binding between an entity's public key and its real world identity. Real world identities are values that have meaning to general applications that use certificates and include identifiers such as email addresses, first and last names, social insurance numbers, telephone numbers, URL's, or IP addresses. In X.509 certificates, only the identity of the issuer of the certificate and the holder of the certificate are included in the certificate body.

In order to allow a distributed arrangement of certifying authorities, they are arranged in a hierarchical fashion. Referring to FIG. 1, a root authority 1 certifies subordinate authorities 2, 3, 4 and so on in a chain down to an end user 5. However, the identities of the issuer's certificate issuer 3 and other higher level entities 1, 2 are not mentioned and must be gathered independently to reconstruct the certificate chain.

Also, certificates containing real world identities for both the certificate holder and the certificate issuer and are published in public directories. While application servers may want their real world identities known to many, application users may want some degree of anonymity or pseudonymity that a real world identity cannot provide.

SUMMARY OF THE INVENTION

According to the present invention there is provided a method of establishing a secure communication in a digital communications network having a hierarchical arrangement of a certificate servers, comprising the steps of generating a first private/public key pair in a root certificate server; issuing a digital certificate for a public key portion of said first private/public key pair signed by said root certificate server and identified by a digital identifier associated with said root certificate server; generating additional private/public key pairs in subordinate entities and associating public key portions of said additional private/public key pairs with pseudonymic digital identifiers associated with said respective subordinate entities; and issuing additional digital certificates binding said pseudonymic digital identifiers of said subordinate entities to the public key portion of their respective private/public key pairs from certificate servers that are in parental relationship to said subordinate entities, said additional digital certificates having a digital certificate identifier containing the pseudonymic digital identifier of the certified subordinate entity and the identifier of said certificate server issuing the additional digital certificate.

The subordinate entities can either be end users or lower level certificate servers. For example, some end users might be certified directly by the root server, whereas other end users would be certified by lower level certificate servers which are themselves certified by higher level servers extending up the chain to the root certificate server.

In accordance with the principles of the invention, digital certificates are constructed that bind an entity's public key to a pseudonym. Certificate holders can choose to reveal additional information about themselves to applications using methods such as digital permits. The lower level servers include in their identifiers the pseudonyms of the higher level servers so that upon inspection of a certificate identifier it is possible to construct the complete chain, or part of a certificate chain, through the hierarchy of certificate servers to the root server.

Use of compact pseudonyms in public key certificates also provides a low-overhead method to reference a certificate chain that can be used to verify the authenticity of an end-entity's digital certificate. In many standard security protocols such as TLS, WTLS, SSL or S/MIME, an entity using a digital certificate to authenticate itself generally provides a list of digital certificates that can be used to construct a chain for some other party to verify the authenticity of the entity's certificate. For applications over constrained networks such as wireless networks, this increases the bandwidth used. Further, for constrained devices such as smartcards or mobile phones, there may be limited storage space to store the required certificates. An improved method of conveying information used to construct the certificate chain is needed and this invention is an effective method of identifying the certificate chain as a concatenation of pseudonyms.

In another aspect the invention provides a digital communications network capable of providing secure communication, comprising a root certificate server associated with a private and public key and a digital certificate signed by said root certificate server certifying the public key thereof, said root certificate server having a memory for storing said digital certificate, and said memory including a register portion for storing a digital identifier associated with said root certificate server; a plurality of subordinate entities associated with respective pseudonymic digital identifiers and comprising subordinate certificate servers and end users in a hierarchical arrangement with said root certificate server, said subordinate certificate servers issuing digital certificates to lower level entities in said hierarchical arrangement to bind public keys of said lower level entities to their respective pseudonymic digital identifiers; and said subordinate certificate servers having memories for storing an identifier for the issued digital certificates, said memories including a first register portion for storing the pseudonymic digital identifier of the issuing certificate server and at least one additional register portion for storing the digital identifier of the or each higher level certificate server in said hierarchical arrangement.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

Figures 1, 2:
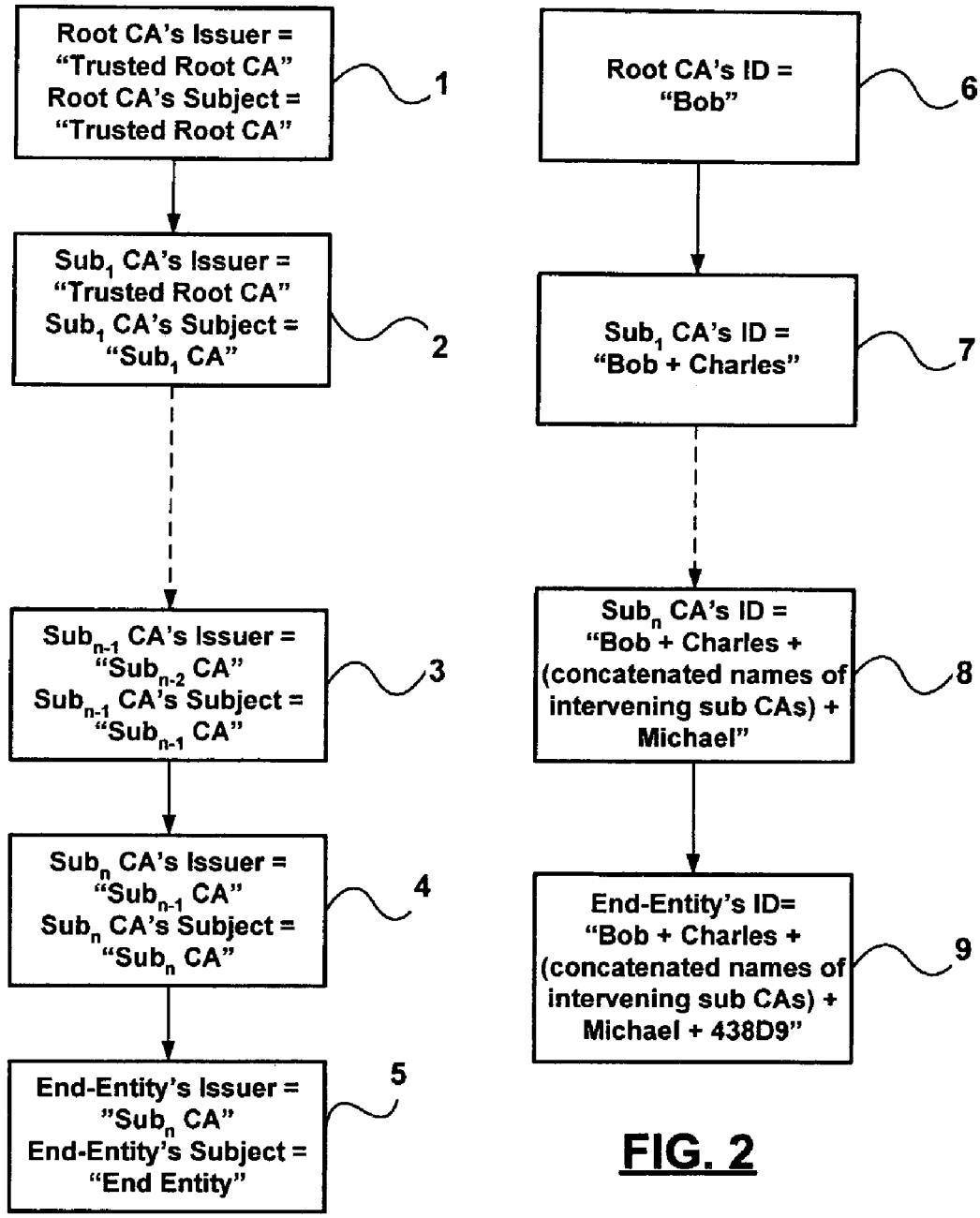
FIG. 1 is a block diagram of the prior art X.509 standard for generating a certificate chain.
FIG. 2 is a block diagram of a certificate chain generating system in which the invention could be implemented.

In accordance with the principles of the invention a root certificate authority (CA) operator generates its public key pair and chooses a pseudonym. It constructs a self-signed digital certificate where the certificate identifier is the root CA operator's pseudonym. The root CA operator publishes its digital certificate and offers the service of certifying other CAs' or end-entities' public keys and issuing digital certificates binding these public keys to the entities' pseudonyms. The pseudonyms contained in certificates issued by this root CA could be chosen or generated by the entities requesting certificates, could be chosen or generated by the root CA, or could be chosen or generated by some other entity. The generated pseudonyms may be in the form of random strings. Alternatively, the pseudonyms may not be placed in the certificate but may be based, at least in part, on identity, or other information, contained in the certificate. The root CA may also put other information in its digital certificate such as certificate validity period, key usage or certificate policy information and may generate this certificate in a format that is syntactically compliant with a standard such as X.509. A root CA is identified by its pseudonym 6.

A sub-CA has a similar procedure for setting up its operations, only instead of generating a self-signed certificate, it submits its public key to the root CA for certification. The root CA may choose to assign the sub-CA a pseudonym or accept one submitted by the sub-CA. The root CA inserts the concatenation of its identity and the sub-CA's pseudonym in the certificate identity field. A sub-CA which has had its public key certified by a root CA has the identity Root CA's pseudonym+Sub-CA's pseudonym 8. Two sub-CA's can have the same pseudonym but can be uniquely identified if they have been certified by different root CA's. To prevent ambiguity CA's should not certify two public keys with the same pseudonym. A message is sent from the root CA to the sub-CA confirming that a certificate has been issued, possibly containing the certificate identifier. The root CA deposits the certificate in a directory.

A sub-CA can certify or assign a pseudonym to another sub-CA using the same rules.

A CA may do work to determine the real world identity of a CA to whom it issues a certificate but this real world identity is not necessarily included in the digital certificate. The goal is to create a certificate hierarchy based entirely on pseudonyms.

An end entity is an entity that would like its public key certified and linked to a pseudonym but does not issue certificates itself. Generally this would be an application server, a device (smartcard, phone, PDA), or a user of an application (TLS, WTLS, SSL, S/MIME, IPSEC, or a proprietary certificate-based application).

The end-entity generates its public key pair and submits the public key to a CA to certify it in a digital certificate. The CA may use some method to verify the end-entity's real world identity or another pseudonym the entity is known by. Records and information used to verify this other identity may be saved and maintained by the CA or erased or destroyed so that no records of the link remain with the CA once the certificate has been issued. The CA may choose to assign the end-entity a pseudonym or accept one submitted by the end-entity. The CA inserts the concatenation of its identity and the end-entity's pseudonym in the certificate identity field. An end-entity which has had its public key certified by a CA has the identity (CA's pseudonym+end-entity's pseudonym) 9. The CA may also fill information in other fields of the certificate as required. The certificate holder can be identified as the issuing CA's identity concatenated with the end-entity's pseudonym.

A message is sent from the CA to the end-entity confirming that a certificate has been issued, possibly containing the certificate identifier. The CA deposits the certificate in a directory.

During a transaction, the certificate holder presents the other party with its certificate identity containing its pseudonym. The party that the certificate holder is transacting with knows the certificate holder by this pseudonym by some other method. These methods may include persistent contact where the other party becomes familiar with the certificate holder through interaction over the course of some time, by a pre-registration method where the certificate holder presents real world identification credentials in confidence to the other entity, or by use of containing identity information in a digital permit.

The other party parses the certificate identity and determines if it contains the pseudonym of a CA it trusts. If a trusted CA pseudonym is present, the other party looks up the necessary certificates by specifying each pseudonym to the directory service. A directory service may be configured to return the entire certificate chain if all pseudonyms are specified at once; this is the preferred method.

To accommodate certificate renewal or key update where an entity keeps its same pseudonym, a sequence number is introduced as a parameter to the pseudonym. At system initialization, a sequence number of "1" is transparently assigned to each pseudonym and included in each occurrence of a pseudonym in a digital certificate. When a new certificate is issued to an entity to facilitate, for example, certificate renewal, the pseudonym is assigned an incremented sequence number parameter and this is included in the new certificate. The entity maintaining the directory of certificates returns the certificate with the highest sequence number when a fetch request is made. For CA certificates, when the sequence number is incremented, all certificates below that particular CA on the chain must be resigned.

Figure 3:
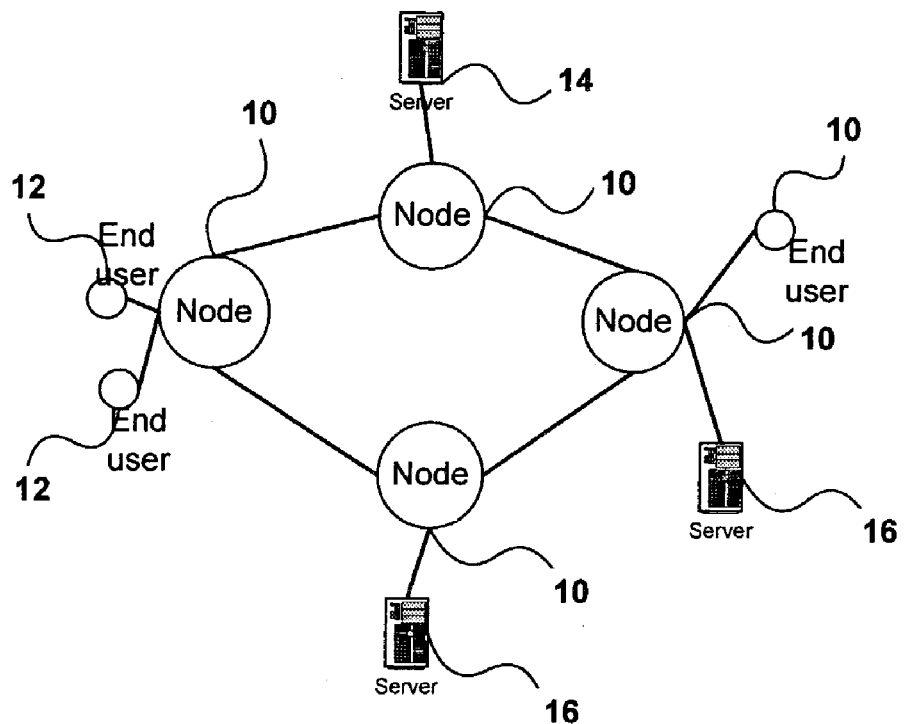
FIG. 3 is a schematic diagram of a packet-switched network employing certificate servers.
Figure 4:
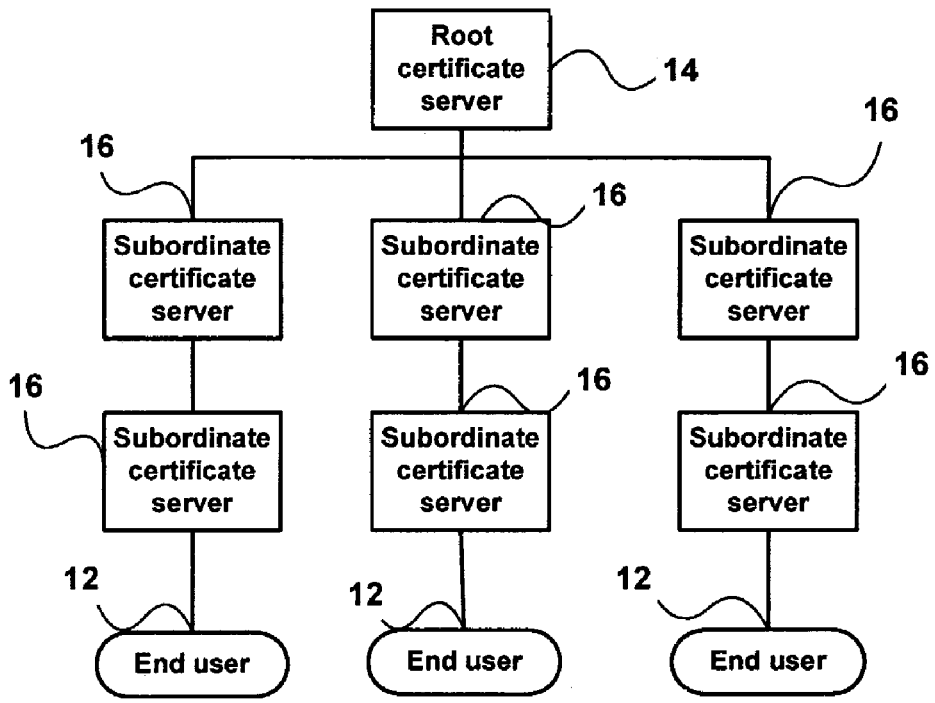
FIG. 4 is a block diagram of the hierarchical arrangement of certificate servers.

Referring now to FIG. 3, the invention is illustrated with reference to a packet switched network, such as the Internet, comprising a plurality of distributed nodes shown connected to end users 12 and distributed servers 14, 16. The servers act as the certificate authorities. Server 16 is a root certificate server and servers 16 are subordinate certificate servers as shown in FIG. 4.

The root server 14 generates a private/public key pair in a conventional manner. The root server 14 then issues a digital certificate certifying the public key or a next level subordinate server 16 or end user 12. This digital certificate is signed by its private key so that a third party with the trusted public key of the root server 14 can verify the public key of a subordinate entity certified by the root server. This methodology continues through the hierarchy. Subordinate servers 16 certify next level subordinate servers and so on down to the lowest level entities, which are the end users 12.

Each certificate server 16 issuing a digital certificate bind the public key of the certified entity to a pseudonymic digital identifier of the certified identity. Additionally it includes the pseudonymic digital identifiers of all the certifying certificate servers in the hierarchy back up to the root server 14 so that from a single digital certificate it is possible to follow the chain back to a trusted certificate server. The pseudonymic digital identifiers are preferably concatenated but they could be stored in the digital certificates in some other form.

Figure 5:
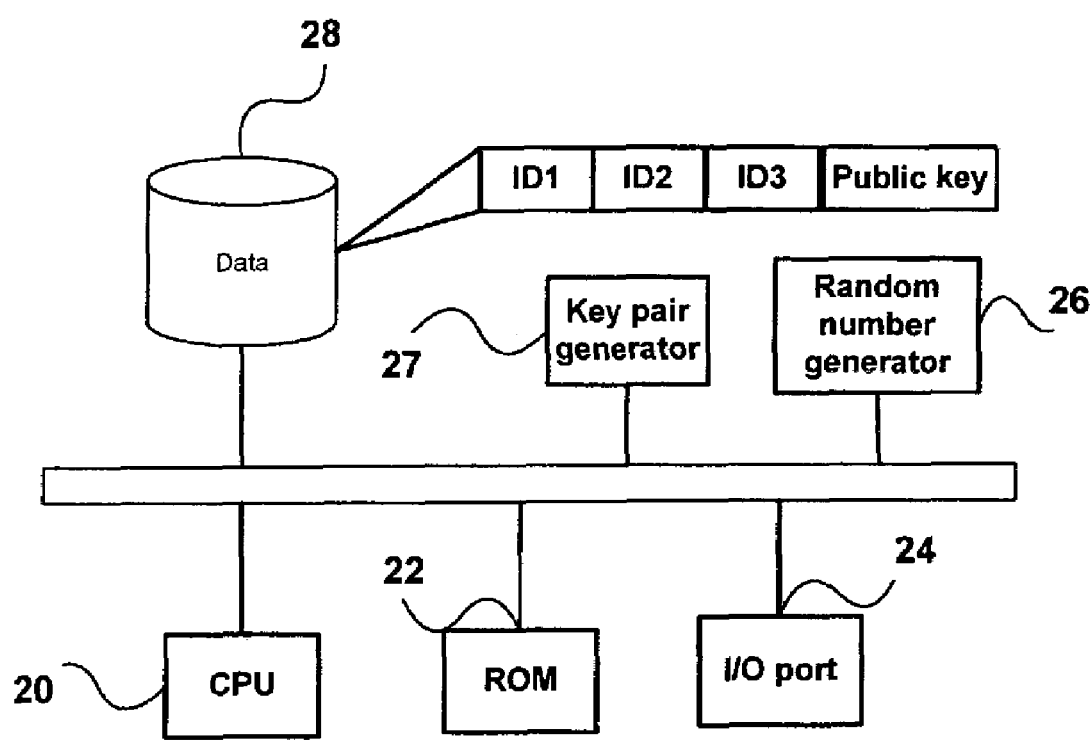
FIG. 5 is a block diagram of a certificate server.

FIG. 5 is a block diagram of a certificate server16. As will be seen the certificate server includes a CPU 20, a ROM 22 for storing a program controlling the CPU 20, and an I/O port for connection to the network. Key pair generator 27, which can be implemented in software under the control of the CPU 20, generates a public/private key pair for the certificate server. Random number generator 26 can be used to generate a pseudonymic digital identifier for the certificate server or for assignment to a lower level entity.

Data storage device stores the digital certificates issued by the certificate server. These include concatenated fields, ID1, ID2 . . . etc, containing the pseudonymic digital identifier of the certified entity and all the higher level certifying servers back to the root server. An additional field is provided to contain the public key of the certified entity, which could either be a lower level certificate server or an end user.

This concludes the description of the preferred embodiment of the invention. The foregoing description has been presented for the purpose of illustration and is not intended to be exhaustive or to limit the invention to the precise form disclosed. Many modifications and variations are possible in light of the above teaching and will be apparent to those skilled in the art. It is intended the scope of the invention be limited not by this description but by the claims that follow.

We claim:

1. A method of establishing a secure communication in a digital communications network having a hierarchical arrangement of certificate servers, comprising the steps of:

generating a first private/public key pair in a root certificate server;

issuing a digital certificate for a public key portion of said first private/public key pair signed by said root certificate server and identified by a digital identifier associated with said root certificate server;

generating additional private/public key pairs in subordinate entities and associating public key portions of said additional private/public key pairs with pseudonymic digital identifiers associated with said respective subordinate entities; and, issuing additional digital certificates binding said pseudonymic digital identifiers of said subordinate entities to the public key portion of their respective private/public key pairs from certificate servers that are in parental relationship to said subordinate entities, said additional digital certificates having a digital certificate identifier containing the pseudonymic digital identifier of the certified subordinate entity and the identifier of said certificate server issuing the additional digital certificate.

2. A method as claimed in claim 1, wherein the subordinate entities requesting digital certificates are assigned pseudonymic digital identifiers by the root server.

3. A method as claimed in claim 1, wherein the subordinate entities requesting digital certificates generate their own pseudonymic digital identifiers.

4. A method as claimed in claim 1, wherein said pseudonymic digital identifiers are random strings.

5. A method as claimed in claim 1, wherein said pseudonymic digital identifiers are selected by a third party.

6. A method as claimed in claim 1, wherein said hierarchical arrangement of certificate servers is in the form of at least one chain of certificate servers, and lower level certificate servers issue digital certificates with identifiers containing all the identifiers of higher level certificate servers in the hierarchy.

7. A method as claimed in claim 1, wherein said additional digital certificates have a digital certificate identifier that is a concatenation of the pseudonymic digital identifier of the certified subordinate entity and the identifier of said certificate server issuing the additional digital certificate.

8. A method as claimed in claim 1, wherein said subordinate entities comprise said subordinate certificate servers.

9. A method as claimed in claim 1, wherein said subordinate entities also include end users.

10. A method as claimed in claim 9, wherein said root server issues digital certificates for at least some of said end users.

11. A method as claimed in claim 9, wherein certificate servers that are subordinate to said root server issue digital certificates to at least some of said end users.

12. A method of establishing a secure communication in a digital communications network having a hierarchical arrangement of a certificate servers wherein higher level certificate servers issue digital certificates for certificate servers lower in the hierarchy, comprising the steps of:

generating a first private/public key pair in a root certificate server;

issuing a digital certificate for a public key portion of said first private/public key pair signed by said root certificate server and identified by a digital identifier associated with said root certificate server;

generating additional private/public key pairs in subordinate certificate servers and associating public key portions of said additional private/public key pairs with pseudonymic digital identifiers associated with said respective subordinate certificate servers; and, issuing additional digital certificates binding said pseudonymic digital identifiers of said subordinate certificate servers to the public key portion of their respective private/public key pairs from certificate servers that are in parental relationship to said subordinate entities, said additional digital certificates having a digital certificate identifier containing the pseudonymic digital identifier of the certified subordinate entity and the digital identifier the or each higher level certificate server in said hierarchical arrangement up to the root certificate server.

13. A method as claimed in claim 12, wherein said digital certificate identifiers for said additional digital certificates comprise a concatenation of the digital identifiers for the or each higher level certificate server up to the root server.

14. A digital communications network capable of providing secure communication, comprising:
  a root certificate server associated with a private and public key and a digital certificate signed by said root certificate server certifying the public key thereof, said root certificate server having a memory for storing said digital certificate, and said memory including a register portion for storing a digital identifier associated with said root certificate server;
  a plurality of subordinate entities associated with respective pseudonymic digital identifiers and comprising subordinate certificate servers and end users in a hierarchical arrangement with said root certificate server, said subordinate certificate servers issuing digital certificates to lower level entities in said hierarchical arrangement to bind public keys of said lower level entities to their respective pseudonymic digital identifiers; and,
  said subordinate certificate servers having memories for storing an identifier for the issued digital certificates, said memories including a first register portion for storing the pseudonymic digital identifier of the issuing certificate server and at least one additional register portion for storing the digital identifier of the or each higher level certificate server in said hierarchical arrangement.

15. A digital communications network as claimed in claim 14, wherein said register portions of said memories in said subordinate certificate servers correspond to fields, each containing a digital identifier.

16. A digital communications network as claimed in claim 15, wherein said fields are arranged to concatenate the digital identifiers of each certificate server in said hierarchical arrangement.

17. A digital communications network as claimed in claim 14 wherein said subordinate entities comprises random number generators for generating said pseudonymic digital identifiers.

* * * * *